United States Patent
Andreev et al.

(10) Patent No.: US 7,404,166 B2
(45) Date of Patent: Jul. 22, 2008

(54) METHOD AND SYSTEM FOR MAPPING NETLIST OF INTEGRATED CIRCUIT TO DESIGN

(75) Inventors: Alexander E. Andreev, San Jose, CA (US); Pavel Panteleev, Moscow (RU); Andrey A. Nikitin, Moscow (RU)

(73) Assignee: LSI Corporation, Milpitas, CA (US)

(*) Notice: Subject to any disclaimer, the term of this patent is extended or adjusted under 35 U.S.C. 154(b) by 249 days.

(21) Appl. No.: 11/257,289

(22) Filed: Oct. 24, 2005

(65) Prior Publication Data

US 2007/0094633 A1 Apr. 26, 2007

(51) Int. Cl.
*G06F 17/50* (2006.01)
(52) U.S. Cl. .................. 716/9; 716/10; 716/12; 716/13; 716/14
(58) Field of Classification Search ............ 716/12, 716/13, 14, 9, 10
See application file for complete search history.

(56) References Cited

U.S. PATENT DOCUMENTS

| | | | | |
|---|---|---|---|---|
| 5,475,608 A | * | 12/1995 | Masuoka | 716/8 |
| 5,659,796 A | * | 8/1997 | Thorson et al. | 709/241 |
| 5,818,729 A | * | 10/1998 | Wang et al. | 716/9 |
| 6,405,355 B1 | * | 6/2002 | Duggirala et al. | 716/8 |
| 7,111,264 B2 | * | 9/2006 | Andreev et al. | 716/9 |
| 2004/0111687 A1 | * | 6/2004 | Dhanwada et al. | 716/8 |

OTHER PUBLICATIONS

Ajami et al., "Post-Layout Timing-Driven Cell Placement using an Accurate Net Length Model with Movable Steiner Points", Jan. 2001, IEEE Proceedings of the ASP-DAC, pp. 595-600.*

* cited by examiner

*Primary Examiner*—Sun J. Lin
(74) *Attorney, Agent, or Firm*—Suiter Swantz PC LLO

(57) ABSTRACT

The present invention provides a method for mapping a netlist of an integrated circuit to a design. The method includes steps as follows. Chaos algorithm is used to obtain most favorable places in the design for cells from the netlist. Kuhn's algorithm is utilized to assign each cell of the netlist a cell in a template so that, for each cell of the netlist, its place in the template is as close as possible to its place obtained by the chaos algorithm. Simulating annealing optimization technique is applied to reduce a sum of wire length of the design.

17 Claims, 4 Drawing Sheets

```
Used variables:
    C(c) - coordinate of cell c, c ∈ Cells(N);
    C(w) - pseudo coordinate of wire w, w ∈ Wires(N);
for all c ∈ Cells(N) do C(c) := C(T);
for i from 1 to cycle_number do
    if i < 0.3·cycle_number then k := 2;
    else k := 1;
    for all w ∈ Wires(N) do
```
$$C(w) := \frac{1}{|Cells(w)| + |Pins(w)|}\left(\sum_{c \in Cells(w)} C(c) + \sum_{p \in Pins(w)} k \cdot C(p)\right);$$
```
    end for
    for all c ∈ Cells(N) do
```
$$C(c) := \frac{1}{|Wires(c)|}\left(\sum_{w \in Wires(c)} C(w)\right);$$
```
    end for
end for
```

*FIG. 3*

Used variables:
  k - cool coefficient (typical value is 0.95)
  t - current temperature;
  $t_{beg}$, $t_{fin}$ - initial and final temperatures;
  L, $L_{min}$ - current and minimum sums of wire lengths;
  $\Delta L$ - the variation of the sum of wire lengths
  f, $f_{best}$ - current and best assignment functions;
begin
  t = $t_{beg}$;
  $L_{min}$ := L := current sum of wire lengths of T;
  while t > $t_{fin}$ do
    for i from 1 to n do
      ($c_1'$, $c_2'$) is next pair of Pairs(T);
      $\Delta L$ := $\Delta L(c_1', c_2')$;
      if random(exp(-$\Delta L$/t)) then
        f := swap(f, $c_1'$, $c_2'$);
        L := L + $\Delta L$;
        if L < $L_{min}$ then
          $L_{min}$ := L;
          $f_{best}$ := f;
        end if
      end if
    end for
    t := k·t;
  end while
end

*FIG. 4*

METHOD AND SYSTEM FOR MAPPING NETLIST OF INTEGRATED CIRCUIT TO DESIGN

FIELD OF THE INVENTION

The present invention generally relates to the field of integrated circuits, particularly to a method and system for mapping a netlist of an integrated circuit to a design.

BACKGROUND OF THE INVENTION

Platform-based IC (integrated circuit) design is a powerful concept for coping with the increased pressure on time-to-market, design and manufacturing costs encountered in the current IC market. A platform is a large-scale, high-complexity semiconductor device that includes one or more of the following elements: (1) memory; (2) a customizable array of transistors; (3) an IP (intellectual property) block; (4) a processor, e.g., an ESP (embedded standard product); (5) an embedded programmable logic block; and (6) interconnect. RapidChip™ developed by LSI Logic Corp. is an instance of a platform. The basic idea behind the platform-based design is to avoid designing and manufacturing a chip from scratch. Some portion of the chip's architecture is predefined for a specific type of application. Through extensive design reuse, the platform-based design may provide faster time-to-market and reduced design cost.

Under a platform approach, there are two distinct steps entailed in creating a final end-user product: a prefabrication step and a customization step. In a prefabrication step, a slice is built on a wafer. A slice is a pre-manufactured chip in which all silicon layers have been built, leaving the metal layers or top metal layers to be completed with the customer's unique IP. For example, RapidSlice™ developed by LSI Logic Corp. is an instance of a slice. One or more slices may be built on a single wafer. It is understood that a slice may include one or more bottom metal layers or may include no metal layers at all. In a preferred embodiment of the prefabrication step, portions of the metal layers are pre-specified to implement the pre-defined blocks of the platform and the diffusion processes are carried out in a wafer fab. The base characteristics, in terms of the IP, the processors, the memory, the interconnect, the programmable logic and the customizable transistor array, are all pre-placed in the design and pre-diffused in the slice. However, a slice is still fully decoupled because the customer has not yet introduced the function into the slice. In a customization step, the customer-designed function is merged with the pre-defined blocks and the metal layers (or late-metal components) are laid down, which couple the elements that make up the slice built in the wafer fab, and the customizable transistor array is configured and given its characteristic function. In other embodiments, early-metal steps may be part of the pre-fabricated slice to reduce the time and cost of the customization step, resulting in a platform which is more coupled and specific. It is understood that a prefabrication step and a customization step may be performed in different foundries. For example, a slice may be manufactured in one foundry. Later, in a customization step, the slice may be pulled from inventory and metalized, which gives the slice its final product characteristics in a different foundry.

A slice such as RapidSlice™ may contain several RRAMs (Reconfigurable RAMs, or Redundant RAMs, or Rapid-Slice™ RAMs). Each RRAM is a set of memories of the same type that are placed compactly. RRAMs include built-in testing and self-repairing components and include a set of tools for mapping arbitrary customer memories (logical memories) to the memories from the matrix (physical memories). All RRAM memory ports are ports of customer memories. Ports of memories from the matrix are invisible from outside a RRAM. Thus, from the customer's point of view a RRAM is a set of customer memories.

A netlist describes the connectivity of an IC design. The problem of mapping a netlist to a design, which includes cells with predefined locations, often rises up during the development of chips based on the RapidChip™ technology, and/or FPGA. RapidChip™ technology uses RRAM cells that include pre-diffused internal memories and R-Cells. An R-Cell is a 5 transistor element configured by metal. In order to implement a customer memory mapped to RRAM, the memory may be represented as a tiling netlist of R-Cells and internal RRAM memories. Each memory of the tiling netlist may have already been assigned to the internal memory of RRAM. Therefore, what is needed is to map R-Cells of the netlist to the pre-diffused R-Cells of the RRAM.

Consider a set (called a template design or template) T of cells and pins with predefined locations in RRAM. T has no wires. Let N be a netlist such that it has cell types that are instantiated in T only. All the input and output pins of the netlist N are assigned to predefined pins of T. In order to obtain a design that implements the netlist N, pins of cells of T need be connected to pins of T that correspond to the pins of N by wires. Since the total wire length is an important consideration in IC design, thus, it is desirable to provide a solution with the sum of wire length being as minimal as possible.

SUMMARY OF THE INVENTION

In an exemplary aspect, the present invention provides a method for mapping a netlist of an integrated circuit to a design. The method includes steps as follows. Chaos algorithm may be used to obtain most favorable places in the design for cells from the netlist. Kuhn's algorithm may be utilized to assign each cell of the netlist a cell in a template so that, for each cell of the netlist, its place in the template is as close as possible to its place obtained by the chaos algorithm. Simulating annealing optimization technique may be applied to reduce a sum of wire length of the design.

In an additional exemplary aspect, the present invention provides a system for mapping a netlist of an integrated circuit to a design. The system may include means for using Chaos algorithm to obtain most favorable places in the design for cells from the netlist, means for utilizing Kuhn's algorithm to assign each cell of the netlist a cell in a template so that, for each cell of the netlist, its place in the template is as close as possible to its place obtained by the chaos algorithm, and means for applying simulating annealing optimization technique to reduce a sum of wire length of the design.

In another exemplary aspect, the present invention provides a computer-readable medium having computer-executable instructions for performing a method for mapping a netlist of an integrated circuit to a design. The method includes steps as follows. Chaos algorithm may be used to obtain most favorable places in the design for cells from the netlist. Kuhn's algorithm may be utilized to assign each cell of the netlist a cell in a template so that, for each cell of the netlist, its place in the template is as close as possible to its place obtained by the chaos algorithm. Simulating annealing optimization technique may be applied to reduce a sum of wire length of the design.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 3 shows the pseudocode for using chaos algorithm to obtain most favorable places in a design for cells from a netlist in accordance with an exemplary embodiment of the present invention; and FIG. 4 shows the pseudocode for applying simulating annealing optimization technique to reduce a sum of wire length of the design in accordance with an exemplary embodiment of the present invention.

DETAILED DESCRIPTION OF THE INVENTION

Reference will now be made in detail to the presently preferred embodiments of the invention, examples of which are illustrated in the accompanying drawings.

Figure 2:
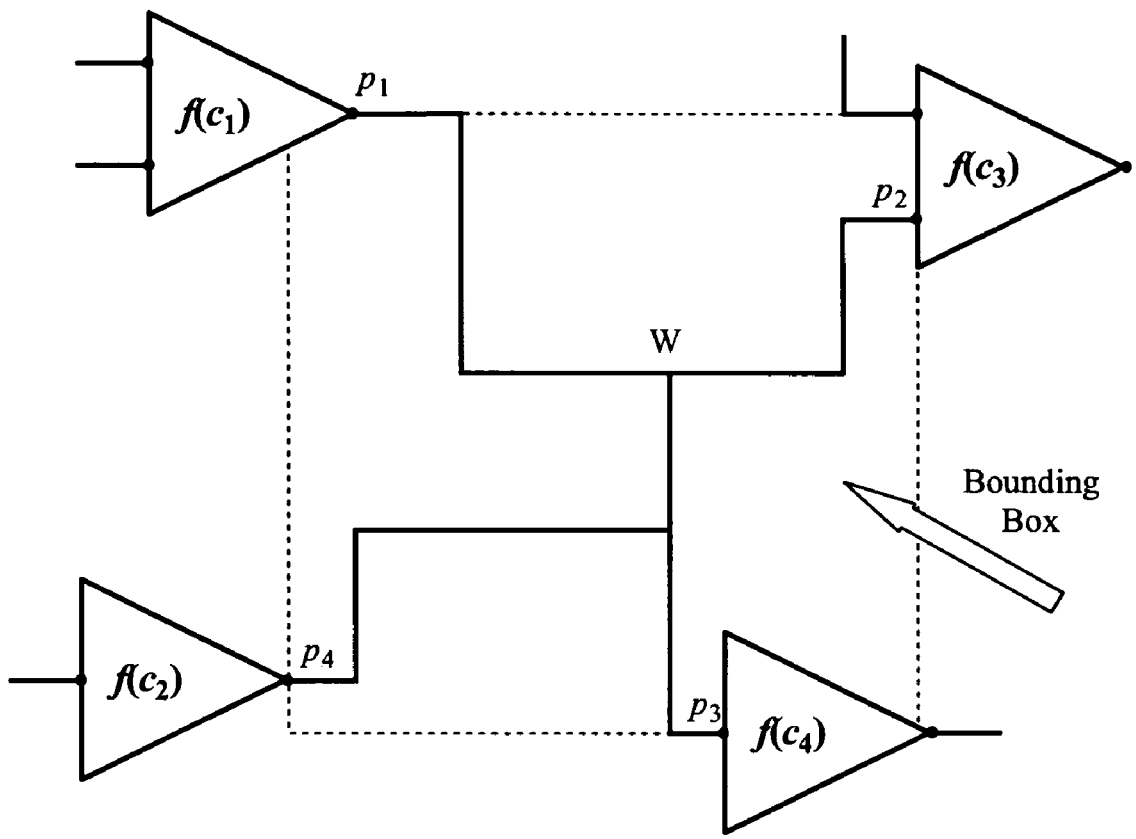
FIG. 2 shows a bounding box in accordance with an exemplary embodiment of the present invention.

Consider a set (called a template design or template) T of cells and pins with predefined locations in RRAM. T has no wires. Let N be a netlist such that it has cell types that are instantiated in T only. All the input and output pins of the netlist N are assigned to predefined pins of T. In order to obtain a design that implements the netlist N, pins of cells of T need be connected to pins of T that correspond to the pins of N by wires. The most natural solution to this problem is to assign each cell in the netlist N a cell in T and then connect by wires the corresponding pins of the assigned cells. Since the total wire length is an important consideration in IC design, the present invention presents a solution with the sum of wire length that is as minimal as possible. In the present invention, routing is not made and estimation of the wire length is considered, e.g., the half perimeter of the bounding box (see FIG. 2) for all the pins connected to the wire. The half perimeter estimation is a heuristic estimation widely used for a long time. Those of ordinary skill in the art will understand that any other estimation may be alternatively used without departing from the scope and spirit of the present invention.

The present invention presents an algorithm that solves the foregoing described problem. It includes two main steps. At the first main step, a preliminary legal assignment is obtained. A chaos algorithm may be used for an initial but not legal assignment. The chaos algorithm is a simple heuristic procedure for obtaining preliminary placement information of wires and cells. It is based on information about relations among cells, wires and pins of main module and also uses pin coordinates of the main module. The output of the chaos algorithm is pseudo coordinates of wires and coordinates of cells. The chaos algorithm may obtain the most preferable places for cells from the netlist N. Then the problem may be reduced to an assignment problem, and Kuhn's algorithm may be used to obtain a legal assignment. Each cell of the netlist N may be assigned a cell in the template T so that its place is as close as possible to the place obtained by the chaos algorithm.

At the second main step, the preliminary solution obtained at the first step is optimized. The simulating annealing optimization technique may be used to achieve this. The process of simulating annealing includes several cycles. A parameter called temperature may be used, which defines the probability of the assignment function modification during random search of better assignment. The temperature is decreased from cycle to cycle. The higher the temperature, the greater the probability of the assignment function modification.

Figure 1:
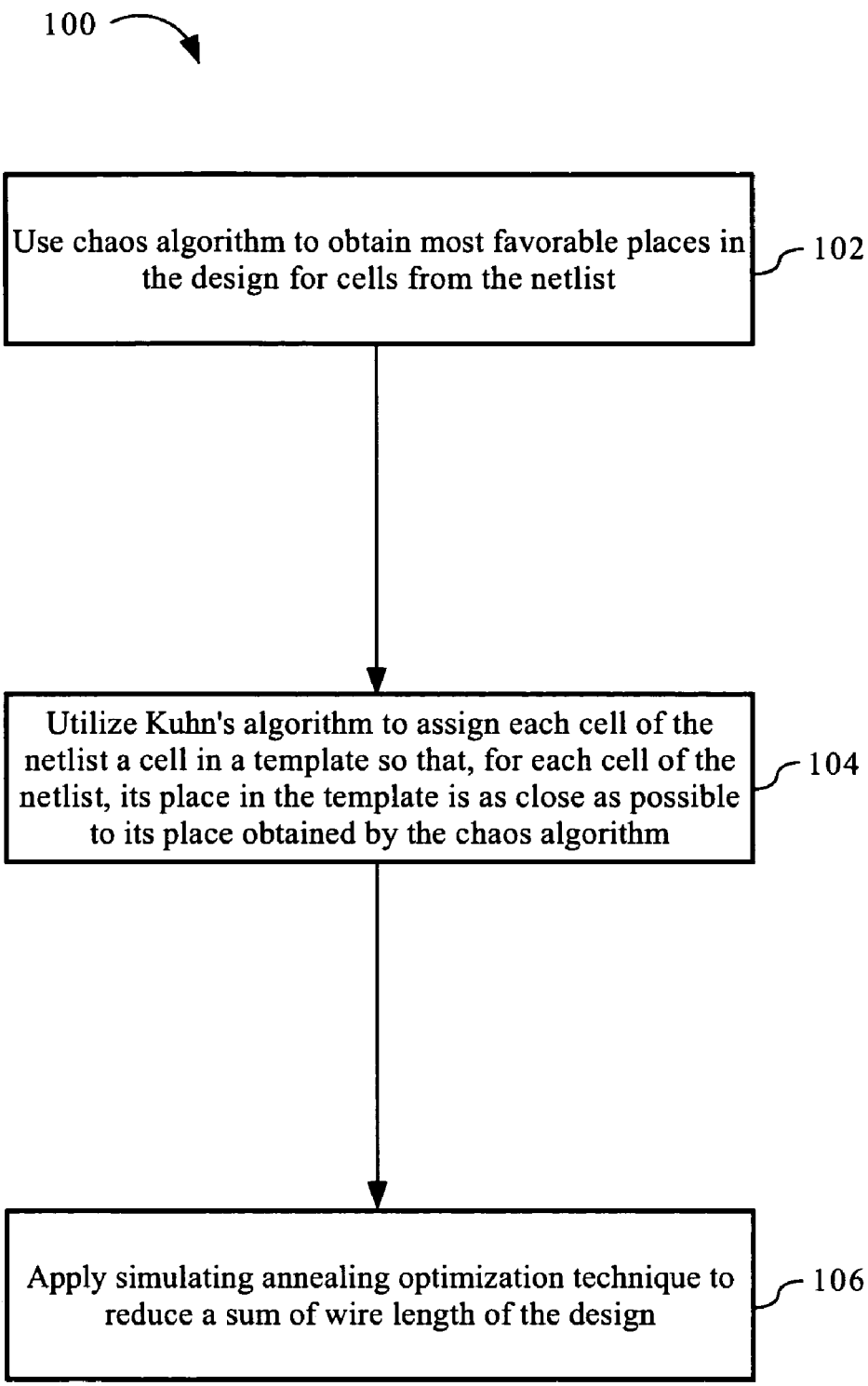
FIG. 1 is a flow diagram of a method for mapping a netlist of an integrated circuit to a design in accordance with an exemplary embodiment of the present invention.

FIG. 1 is a flow diagram of a method 100 for mapping a netlist of an integrated circuit to a design in accordance with an exemplary embodiment of the present invention. The netlist may be a tiling netlist of R-Cells, and the design may be RRAM. The method 100 may include steps as follows. Chaos algorithm may be used to obtain most favorable places in the design for cells from the netlist 102.

Let S be a set of arbitrary elements. Denote by |S| the number of elements in S. Consider the template design T and the netlist N. Denote by Cells(N), Wires(N) and Pins(N) the sets of cells, wires and input or output pins of N, respectively. Each cell c of T has a predetermined location. Denote by C(c) the center of c, i.e., the center of the rectangle that corresponds to c. Let p be a pin of N and denote by C(p) the center of p. Denote by C(T) the center of the template T. Denote by Wires(c), Wires(p) the sets of all the wires in N connected to the cell c and the pin p, respectively. Let w be a wire. Denote by Cells(w), Pins(w) the set of all cells, input/output pins of N connected to w, respectively. Let f: Cells(N)→Cells(T) be an assignment function that assigns each cell $c \in$ Cells(N) a cell of the same type $f(c) \in$ Cells(T). Using f a set of wires Wires(T) may be obtained such that T implements N: for each wire $w \in$ Wires(N) that connects pins of cells $c_1, \ldots, c_k$ one may add wire w' denoted by f(w) to the set Wires(T) and connect w' to the corresponding pins of cells $f(c_1), \ldots, f(c_k)$ in the template T. Denote by L(w') the half perimeter of the bounding box (see FIG. 2) for the centers of pins connected to the wire w'.

Consider $$L(f) = \sum_{w \in Wires(N)} L(f(w)).$$

The main goal of the present algorithm is to find f such that T represents N and L(f) is as little as possible.

The step 102 may involve one parameter cycle_number. A typical cycle_number value is 100. Pseudo coordinates of wires and coordinates of cells may be considered. At the step 102 it is assumed that the coordinate of each cell of N is the center of the template T. On each cycle one may calculate (1) the pseudo coordinate of each wire w as the center of the coordinates of all pins of N connected to w and cells that have pins connected to w; and (2) the coordinate of each cell c as the center of the pseudo coordinates of all wires connected to some pins of c. At first 30% of cycles pins may have greater weight denoted by k (see below) than cells because one may desire to drag cells away from the center of T. FIG. 3 shows the pseudocode for implementing the step 102 in accordance with an exemplary embodiment of the present invention.

At the step 104, Kuhn's algorithm may be utilized to assign each cell of the netlist a cell in a template so that, for each cell of the netlist, its place in the template is as close as possible to its place obtained by the chaos algorithm. The coordinates of cells obtained after the step 102 may be used as preferable coordinates in obtaining the initial legal assignment. Thus, for each cell c ∈ Cells(N), there is a preferable coordinate C(c). One may desire to obtain a legal assignment for the netlist N. In order to achieve this, one may reduce the problem to the classical assignment problem as follows. One may define an assignment of a cell c of N to a cell c' of T as legal if c and c' have the same type. One may use any other restrictions on assignment as well. One may define an assignment function f as legal if, for each cell c of N, assignment f(c) to c is legal. Denote by Leg(N,T) the set of all pairs (c,c') such that c' may be legally assigned to c. For each assignment function f, let the cost P(f) be $$\sum_{c \in Cells(N)} P(c),$$

where P(c) is the square of the distance between points C(c) and C(f(c)). One may use $$\max_{c \in Cells(N)} P(c)$$

as cost function as well. The assignment problem is to find a legal assignment function f of minimal cost. The classical algorithm (Kuhn's algorithm) proposed by H. Kuhn in *The Hungarian method for the assignment problem*, Naval Research Logistics Quarterly, Vol. 2, No. 1, pp. 83-97, 1955 may be used to solve the problem.

At the step 106, simulating annealing optimization technique may be applied to reduce a sum of wire length of the design. The step 104 may provide a solution to the problem, but the sum of wire length may be too much. The aim of the step 106 is to reduce this sum as much as possible. Simulating annealing technique may be used to find a better solution. Simulating annealing algorithm is a kind of random search optimization algorithms that uses analogy between physical process of steel annealing and minimization. One may start the step 106 from an initial temperature $t_0=t_{beg}$ and decrease it with a cool coefficient k, 0<k<1 (typical value is 0.95): $t_{i+1}:=k \cdot t_i$, while $t_i$ is greater than a final temperature $t_{fin}$. For each temperature value $t_i$, one may generate n times new assignment function f' modifying the current assignment function f as follows. One may try to swap cells $c_1'$ and $c_2'$ of the same type in the template T such that at least one of them is assigned to a cell of N and define a new assignment function f'=swap(f, $c_1'$, $c_2'$). Consider two cases: (1) if $f(c_1)=c_1'$ and $f(c_2)=c_2'$, where $c_1$, $c_2$ are cells of N or $c_2'$, then f' is equal to f for all cells of N except for $c_1$, $c_2$ and $f'(c_1)=c_2'$ and $f'(c_2)=c_1'$; and (2) if $f(c_1)=c_1'$ and $c_2'$ is not assigned to any cell of N, then f' is equal to f for all cells of N except for $c_1$ and $f'(c_1)=c_2'$ and $c_1'$ is not assigned to any cell of N in the assignment function f'. One may have a predefined list Pairs(T) of all the pairs of cells $c_1'$, $c_2'$ of the template T that have the same type. One may sort this list by the distance between $C(c_1')$ and $C(c_2')$ because one may try to swap cells that are close to each other first of all. Each time, one may take next element ($c_1'$, $c_2'$) from the list Pairs(T). When the last element of the list is achieved, on may move to the first element and so on. One may consider only pairs ($c_1'$, $c_2'$) such that one of $c_1'$, $c_2'$ is assigned to a cell of N. Let $\Delta L(c_1', c_2')$ be the difference between the sum of wire length for the current assignment function f and the sum of wire length for the new modified assignment function f'=swap(f, $c_1'$, $c_2'$). If $\Delta L(c_1', c_2')<0$, then one may accept the new assignment function f'; otherwise, one may accept it with a probability exp($-\Delta L(c_1', c_2')/T$). Thus, sometimes one may accept an assignment with the sum of wire length that is greater than that of the current assignment function.

FIG. 4 shows the pseudocode for implementing the step 106 in accordance with an exemplary embodiment of the present invention. Random(p) is the predicate that returns the true value with the probability min(1, p). The runtime of this simulating annealing algorithm especially depends on the runtime of the function $\Delta L(c_1', c_2')$ evaluation. Hence, the implementation of $\Delta L(c_1', c_2')$ need be very efficient. To achieve it, one may not recalculate all the elements of the sum $$\sum_{w \in Wires(N)} L(f(w)).$$

Instead, one may calculate the variation of L(f) only for those wires that are actually changed when one changes assignment function. In order to speed up the process, one may assume that the coordinate of a pin of a cell is the center of this cell.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magneto-optical disk, ROM, RAM, EPROM, EEPROM, magnetic or optical card, or any other suitable media for storing electronic instructions.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for mapping a netlist of an integrated circuit to a design, said method comprising steps of:
   using chaos algorithm to obtain most favorable places in said design for cells from said netlist, said using step comprising:

assuming that a coordinate of said each cell of said netlist is a center of said template; and calculating, on each cycle, a pseudo coordinate of each wire w as a center of coordinates of all pins of said netlist connected to said wire w and cells that have pins connected to said wire w, and a coordinate of each cell c as a center of pseudo coordinates of all wires connected to pins of said cell c, utilizing Kuhn's algorithm to assign each cell of said netlist a cell in a template having a set of predefined cells so that, for said each cell of said netlist, its place in said template is as close as possible to its place obtained by said chaos algorithm; and applying simulating annealing optimization technique to reduce a sum of wire length of said design.

2. The method of claim 1, wherein in said applying step a temperature is used, said temperature defining a probability of an assignment function modification during a random search for a better assignment.

3. The method of claim 2, wherein said applying step starts from an initial temperature $t_0 = t_{beg}$ and proceeds with said temperature being decreased with a cool coefficient k: $t_i + 1 = k \cdot t_i$, $0 < k < 1$, $t_i$ being larger than a final temperature $t_{fin}$.

4. The method of claim 3, wherein said cool coefficient k is equal to 0.95.

5. The method of claim 3, wherein, for each temperature $t_i$, n times new assignment function f' is generated to modify a current assignment function f.

6. The method of claim 1, wherein said netlist is a tiling netlist of R-Cells and said design is RRAM.

7. A computer-readable medium having computer-executable instructions for performing a method for mapping a netlist of an integrated circuit to a design, said method comprising steps of:

using chaos algorithm to obtain most favorable places in said design for cells from netlist; said using step comprising:

assuming that a coordinate of said each cell of said netlist is a center of said template; and calculating, on each cycle, a pseudo coordinate of each wire w as a center of coordinates of all pins of said netlist connected to said wire w and cells that have pins connected to said wire w, and a coordinate of each cell c as a center of pseudo coordinates of all wires connected to pins of said cell c, utilizing Kuhn's algorithm to assign each cell of said netlist a cell in a template having a set of predefined cells so that, for said each cell of said netlist, its place in said template is as close as possible to its place obtained by said chaos algorithm; and applying simulating annealing optimization technique to reduce a sum of wire length of said design.

8. The computer-readable medium of claim 7, wherein in said applying step a temperature is used, said temperature defining a probability of an assignment function modification during a random search for a better assignment.

9. The computer-readable medium of claim 8, wherein said applying step starts from an initial temperature $t_0 = t_{beg}$ and proceeds with said temperature being decreased with a cool coefficient k: $t_i + 1 = k \cdot t_i$, $0 < k < 1$, $t_i$ being larger than a final temperature $t_{fin}$.

10. The computer-readable medium of claim 9, wherein said cool coefficient k is equal to 0.95.

11. The computer-readable medium of claim 9, wherein, for each temperature $t_i$, n times new assignment function f' is generated to modify a current assignment function f.

12. The computer-readable medium of claim 7, wherein said netlist is a tiling netlist of R-Cells and said design is RRAM.

13. A system for mapping a netlist of an integrated circuit to a design, said system comprising:

means for using chaos algorithm to obtain most favorable places in said design for cells from said netlist, said means for using comprising:

means for assuming that a coordinate of said each cell of said netlist is a center of said template; and means for calculating, on each cycle, a pseudo coordinate of each wire w as a center of coordinates of all pins of said netlist connected to said wire w and cells that have pins connected to said wire w. and a coordinate of each cell c as a center of pseudo coordinates of all wires connected to pins of said cell c, means for utilizing Kuhn's algorithm to assign each cell of said netlist a cell in a template having a set of predefined cells so that, for said each cell of said netlist, its place in said template is as close as possible to its place obtained by said chaos algorithm; and means for applying simulating annealing optimization technique to reduce a sum of wire length of said design.

14. The system of claim 13, wherein said means for applying uses a temperature, said temperature defining a probability of an assignment function modification during a random search for a better assignment.

15. The system of claim 14, wherein said applying step starts from an initial temperature $t_0 = t_{beg}$ and proceeds with said temperature being decreased with a cool coefficient k: $t_i + 1 = k \cdot t_i$, $0 < k < 1$, $t_i$ being larger than a final temperature $t_{fin}$.

16. The system of claim 15, wherein, for each temperature $t_i$, n times new assignment function f' is generated to modify a current assignment function f.

17. The system of claim 13, wherein said netlist is a tiling netlist of R-Cells and said design is RRAM.

* * * * *